(12) United States Patent
Dearo

(10) Patent No.: US 6,233,869 B1
(45) Date of Patent: May 22, 2001

(54) SUPPORTING FRAME FOR A PORTION OF A STEM OF A PLANT

(75) Inventor: Jérôme Dearo, Ongle (FR)

(73) Assignee: Hortimat Inc., St-Hyacinthe (CA)

( * ) Notice: Subject to any disclaimer, the term of this patent is extended or adjusted under 35 U.S.C. 154(b) by 0 days.

(21) Appl. No.: 09/347,086

(22) Filed: Jul. 2, 1999

(51) Int. Cl.$^7$ .......................... A01G 17/08; A01G 17/10
(52) U.S. Cl. ................................ 47/44; 24/545; 24/487; 47/47
(58) Field of Search .................................. 47/44, 46, 47; 24/545, 487

(56) References Cited

U.S. PATENT DOCUMENTS

| | | | |
|---|---|---|---|
| 2,844,913 | * | 7/1958 | Brill, Jr. .................................... 47/6 |
| 2,968,850 | * | 1/1961 | Tinnerman ........................... 403/397 |
| 3,494,072 | * | 2/1970 | Olson ..................................... 47/44 |
| 4,333,264 | * | 6/1982 | Smrt ....................................... 47/42 |
| 4,483,098 | * | 11/1984 | Anderson ............................... 47/47 |
| 5,027,538 | * | 7/1991 | Wilmes et al. ....................... 40/316 |
| 5,542,209 | * | 8/1996 | Sheu ....................................... 47/44 |
| 5,784,762 | * | 7/1998 | Huntting ........................... 24/129 R |
| 5,979,110 | * | 11/1999 | Tai ..................................... 47/41.01 |
| 6,000,172 | * | 12/1999 | Ballarino ................................. 47/47 |

FOREIGN PATENT DOCUMENTS

| | | | |
|---|---|---|---|
| 102600 | * | 9/1965 | (DK) .................................. 47/47 S |
| 578321 | * | 1/1994 | (EP) . |
| 2247157 | * | 6/1973 | (FR) . |
| 714110 | * | 8/1954 | (GB) ................................. 47/47 S |

OTHER PUBLICATIONS

Photo No. 1 shows a frame made by Bato–Trading BV, Beijerenstraat 2, NL 2460 AB Teraar, Holland, and Agro–Systemes, 3 rue de la Claire, 69009, Lyon, France.

Photo No. 2 shows a frame made by Heli–Trading BV, Monterij 2, NL 4760 AC Zevenbergen, Holland and Agro–Systemes, 3 rue de la Claire, 69009 Lyon, France.

Photo Nos. 3 and 6 show frames made by Agro–Systemes, 3 rue de la Claire, 69009 Lyon, France.

Photo Nos. 4 and 5 show frames made be Brinkman BV, Woutervaweg 10, NL 3690 AA 5, Gravenzande, Holland.

* cited by examiner

Primary Examiner—Peter M. Poon
Assistant Examiner—Son T. Nguyen
(74) Attorney, Agent, or Firm—Ware, Fressola, Van der Sluys & Adolphson LLP

(57) ABSTRACT

A supporting frame for a portion of a stem of a plant comprises a generally arc-shaped guiding member, two spacers projecting away from an inside concave surface of the guiding member, and a pressing member pivotally connected to the spacers. The guiding member, the pressing member and each spacer define a U-shaped cross-section for permitting insertion of the portion of the stem therein. The pressing member is deformable between an open position and a closed position. In the open position, the pressing member is away from the guiding member and the portion of the stem can be inserted between the guiding member and the pressing member. In the closed position, the pressing member is generally arc-shaped and substantially parallel to the guiding member, and the center of the pressing member is spaced away from the guiding member at a predetermined distance which corresponds substantially to the range of thickness of the stem in order to secure therein the portion of the stem after it has been inserted therein in the open position. Once the portion of the stem is secured in the frame, it has a predetermined curvature following the inside concave surface of the guiding member.

29 Claims, 4 Drawing Sheets

SUPPORTING FRAME FOR A PORTION OF A STEM OF A PLANT

FIELD OF THE INVENTION

The present invention is directed to a supporting frame for a portion of a stem of a plant so as to support the portion of the stem in a curved configuration, and thereby prevent the stem from folding under the weight of vegetables or the like. The present invention is particularly useful in the cultivation of vegetable plants or the other type of plants, in greenhouses or elsewhere.

BACKGROUND

In the cultivation of plants such as tomato plants, the stems carrying tomatoes fold under the tomatoes' weight. In this case, the stem folds in such a way that the stem forms an upside down "V". In this position, the stem does not necessarily break but the side walls of the stem at the tip of the "V" collapse and the flow of sap is considerably restrained. Therefore, the tomatoes that had matured on such a fold stem, are smaller.

In order to prevent the stem of a plant from folding in an upside down "V" position, supporting frames are used. The goal of these frames is to curve a portion of the stem without collapsing its side walls and maintain the portion of the stem in a predetermined curvature so that while secured in the frame, it will keep growing normally in the predetermined curvature and provide normal flow of sap the flowers and tomatoes. Advantageously, the frame is installed on a young stem carrying flowers. Consequently, the fruit or vegetable well be growing on a stem already curved by the frame and will not make it fold in an upside down "V" position when they are getting heavy. There are three known types of supporting frames.

Frames of a first type have two coaxial rigid arc-shaped surfaces. The two surfaces are connected together in order to form a U-shaped cross-section. A portion of stem needs to be curved by a user in the curved orientation that corresponds to the arc-shaped surfaces before being inserted therebetween. The installation of a portion of a stem in such a frame is complicated and necessitates both hands of a user.

Known frames of a second type are partially flexible and have one convex arc-shaped surface with a hook at each end of the surface, each hook being opened in opposite directions. For installation, the stem is engaged in one hook, then laid over the convex portion of the arc-shaped surface and finally secured into the other hook in order to maintain a curved position that follows the convex portion of the arc-shaped surface. The second hook is the more flexible part of this kind of frame and helps the installation thereof. However, the installation of such frames remains complicated, necessitating both hands of a user.

Known frames of a third type are similar to the ones of the first type as they have two coaxial arc-shaped surfaces. However, the exterior surface is provided by a continuous member while the interior surface is provided by a plurality of fingers which are individually connected to one side of the continuous member. A cross-section of such frame also has a U-shape. Contrary to the frames of the first type, the continuous member is flexible. Straightening the continuous member results in spacing apart each of the fingers connected to it. This kind of frame can be slightly straightened for installation over a substantially straight portion of a stem. In this case, the stem does not need to be curved too much prior to being inserted into the frame. Therefore, the frame and the inserted portion of the stem will curve together after the installation as the continuous member recovers its initial curved shape. Such frames remain difficult to install, necessitating both hands of a user for their installation, and can slide along the stem or fall off.

There is a need for a frame which is easier to install and advantageously with only one hand. There is also a need for a frame that stays in place on the stem.

SUMMARY OF THE INVENTION

The present invention is directed to a supporting frame for a portion of a stem of a plant that satisfies the above-mentioned needs.

In accordance with the present invention, this object is achieved with a supporting frame for a portion of a stem of a plant where the stem is of a thickness falling within a given range. The frame comprises:

a guiding member having an inside concave surface, two longitudinal opposite sides and two opposite ends, the two opposite ends extending in a first place;

two spacers projecting away from the inside concave surface of the guiding member, each spacer having an extremity, the extremities of the spacers extending in a second plane parallel to the first plane; and a deformable pressing member defining an apex and having two opposite ends and an inside surface facing the inside concave surface of the guiding member, the two opposite ends of the pressing member being pivotally connected to the two extremities of the spacers, respectively;

wherein the guiding member, the pressing member and each spacer define a U-shaped cross-section for permitting insertion of the portion of the stem of the plant therein; and wherein said pressing member is deformable between:

an open position where its apex is located away from the first and the second planes, said apex then being at a greater distance away from the first plane than from the second plane whereby the portion of the stem can be inserted between the guiding member and the pressing member; and a closed position where the apex is spaced away from the guiding member at a predetermined distance which corresponds substantially to the range of thickness of the stem in order to secure therein the portion of the stem after said portion has been inserted between the guiding member and pressing member in said open position, the portion of the stem once secured having a predetermined curvature following the inside concave surface of the guiding member.

In accordance with the present invention, this object is also achieved with another supporting frame for a portion of a stem of a plant where the stem is of a thickness falling within a given range. This frame comprises:

a guiding member having an inside concave surface, two longitudinal opposite sides and two opposite ends, the two opposite ends extending in a first plane;

two spacers projecting away from the inside concave surface of the guiding member, each spacer having an extremity, the extremities of the spacers extending in a second plane parallel to the first plane; and a pressing member having two opposite ends and comprising two parts joined together by a hinge, each of the two parts having an inside surface which faces the inside concave surface of the guiding member, the two opposite ends of the pressing member being pivotally connected to the two extremities of the spacers, respectively;

wherein the guiding member, the pressing member and each spacer define a U-shaped cross-section for permitting insertion of the portion of the stem of the plant therein; and wherein said pressing member is deformable between:
an open position where its hinge is located away from the first and the second planes, said hinge then being at a greater distance away from the first plane than from the second plane whereby the portion of the stem can be inserted between the guiding member and the pressing member; and a closed position where the hinge is spaced away from the guiding member at a predetermined distance which corresponds substantially to the range of thickness of the stem in order to secure therein the portion of the stem after said portion has been inserted between the guiding member and the pressing member in said open position, the portion of the stem once secured having a predetermined curvature following the inside concave surface of the guiding member.

More particularly, a preferred embodiment of the present invention is concerned with a supporting frame for a portion of a stem of a plane where the stem is of a thickness falling within a given range, and the frame comprises:

a generally arc-shaped guiding member having an inside concave surface, two longitudinal opposite sides and two opposite ends, the two opposite ends extending in a first plane;

two spacers projecting away from the inside concave surface of the guiding member and located at the two opposite ends of the guiding member and adjacent to one of its two longitudinal opposite sides, each spacer having an extremity, the extremities of the spacers extending in a second plane parallel to the first plane;

a pressing member having two opposite ends and comprising two generally arc-shaped parts joined together by a hinge, each of the two parts having an inside convex surface which faces the inside concave surface of the guiding member, the two generally arc-shaped parts being substantially parallel to the generally arc-shaped guiding member, the pressing member having an extension projecting away from the inside convex surface of each of its parts and located at each of its opposite ends, each extension having an extremity pivotally connected to the extremity of the corresponding spacer by means of a hinge, the pressing member being deformable between an open position and a closed position; and retaining means for retaining the portion of the stem within the frame when the pressing member is in the closed position, the retaining means comprising two fingers extending from the other one of the two longitudinal opposite sides of the guiding member towards the pressing member in such a way that the portion of the stem secured by the pressing member in closed position, is enclosed between the spacers and the retaining means;

wherein the guiding member, the pressing member and each spacer define a U-shaped cross-section for permitting insertion of the portion of the stem of the plant therein;

wherein the pressing member is in said open position when its hinge is located away from the first and the second planes, said hinge then being at a greater distance away from the first plane than from the second plane whereby a straight portion of the stem can be inserted between the guiding member and the pressing member.

wherein the pressing member is in said closed position when the hinge is spaced away from the guiding member at a predetermined distance which corresponds substantially to the range of thickness of the stem in order to secure therein the portion of the stem after said portion has been inserted between the guiding member and the pressing member in said open position, the portion of the stem once secured having a predetermined curvature following the inside concave surface of the guiding member.

The invention and its advantages will be better understood after reading the non restrictive description of a preferred embodiment of the present invention. This description is given with reference to the appended drawings.

DETAILED DESCRIPTION OF A PREFERRED EMBODIMENT OF THE INVENTION

Figure 1A:
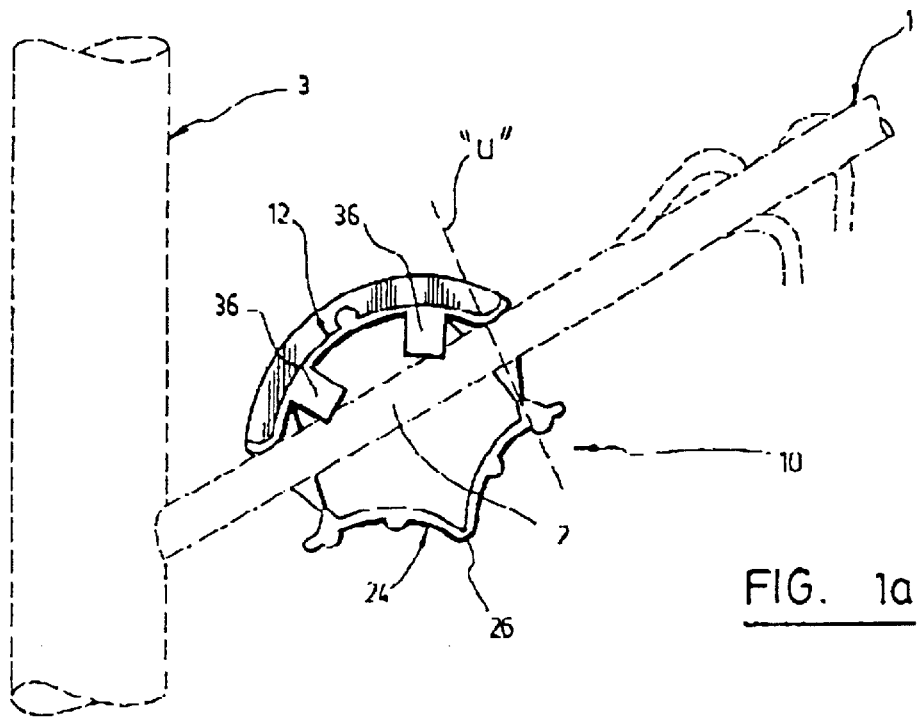
FIG. 1a and 1b are respectively a front view of a supporting frame according to a preferred embodiment of the invention having a portion of a stem of a plant inserted therein, the frame of FIG. 1a being in the open position and the frame of FIG. 1b being in the closed position.

Referring to FIG. 1, a supporting frame (10) according to the present invention is useful to support a portion (2) of a stem (1) of a plant where the stem (1) is of a thickness falling within a given range. The supporting frame (10) can be used on stems of different kinds of plants. However it is particularly useful for the stems of tomato plants. The entire plant is not shown in the accompanying figures although its trunk (3) and some tomatoes (4) can be seen in FIG. 1.

Figure 2:
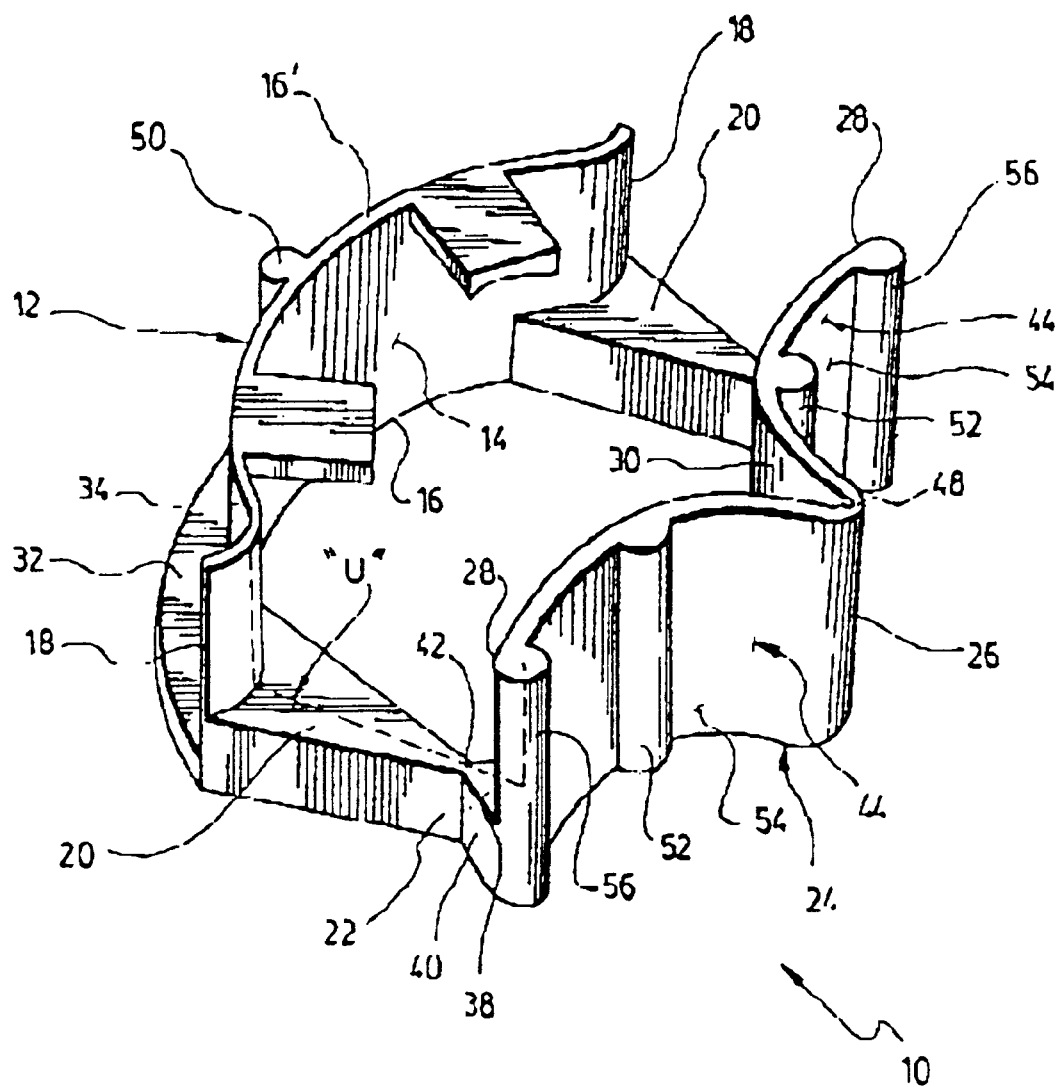
FIG. 2 is a perspective view of a supporting frame of the preferred embodiment of the invention in the open position.

Referring to FIG. 2, the frame (10) comprises a guiding member (12) having an inside concave surface (14), two longitudinal opposite sides (16 and 16') and two opposite ends (18). The two opposite ends (18) extend in a first plane A.

Figure 3:
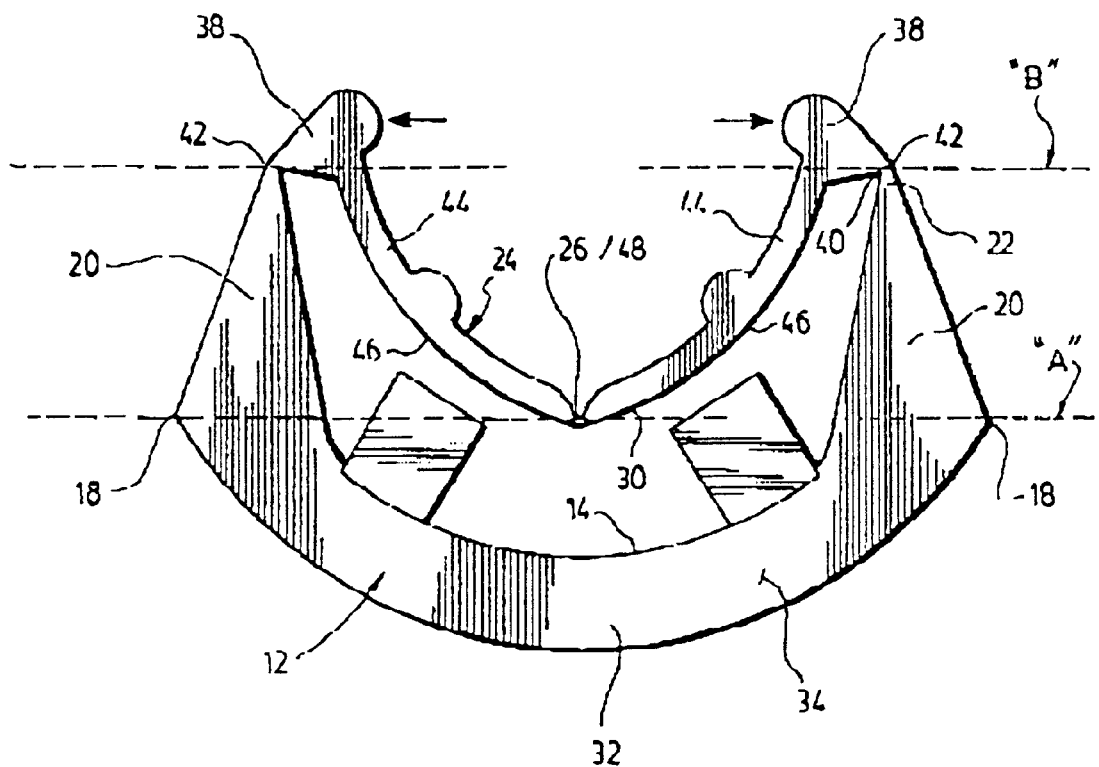
FIG. 3 is a front view of the frame of FIG. 2 in the closed position.

Referring to FIGS. 2 and 3, the frame (10) further comprises two spacers (20) projecting away from the inside concave surface (14) of the guiding member (12). Each spacer (20) has an extremity (22). The extremities (22) of the spacers (20) lie in a second plane B parallel to the first plane A.

Still referring to FIGS. 2 and 3, the frame (10) also comprises a deformable pressing member (24) defining an apex (26). The pressing member (24) has two opposite ends (28) that are pivotally connected to the two extremities (22) of the spacers (20), respectively. The pressing member (24) also has an inside surface (30) facing the inside concave surface (14) of the guiding member (12).

According to the present invention, the guiding member (12), the pressing member (24) and each spacer (20) define a U-shaped cross-section shown in FIGS. 1a and 2, thereby permitting insertion of the portion (2) of the stem (1) of the plant in the frame (10) between the guiding member (12) and the pressing member (24).

Figure 1B:
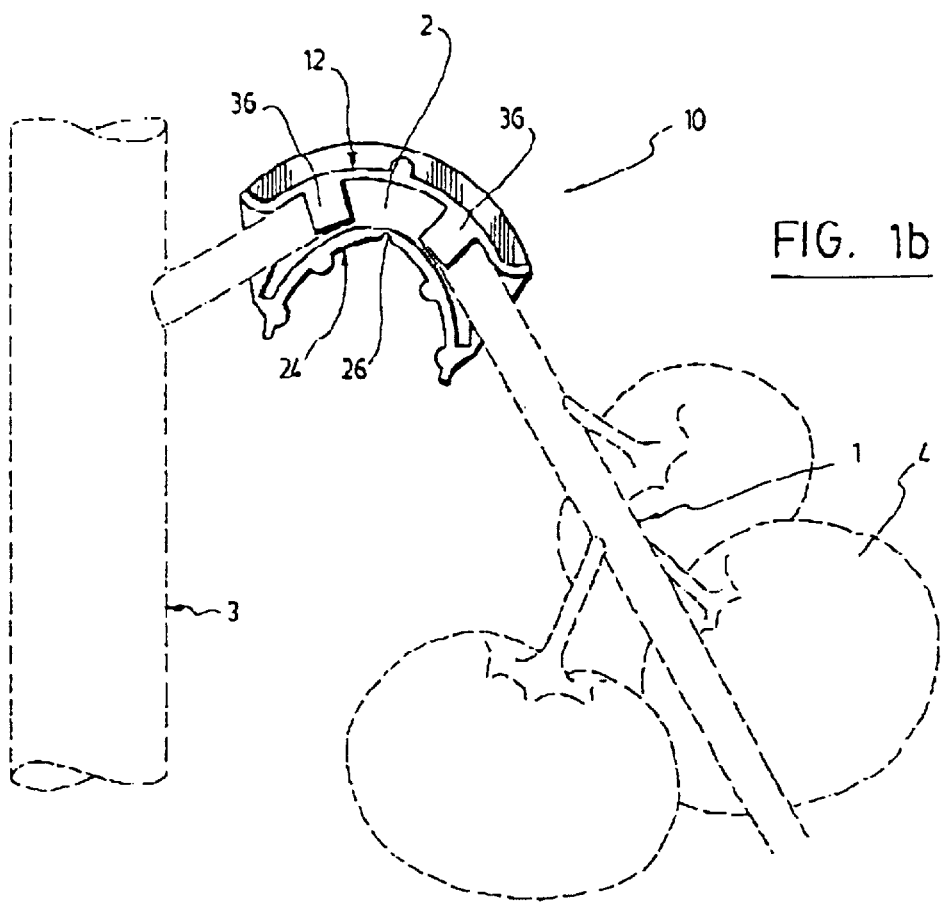
Figure 4:
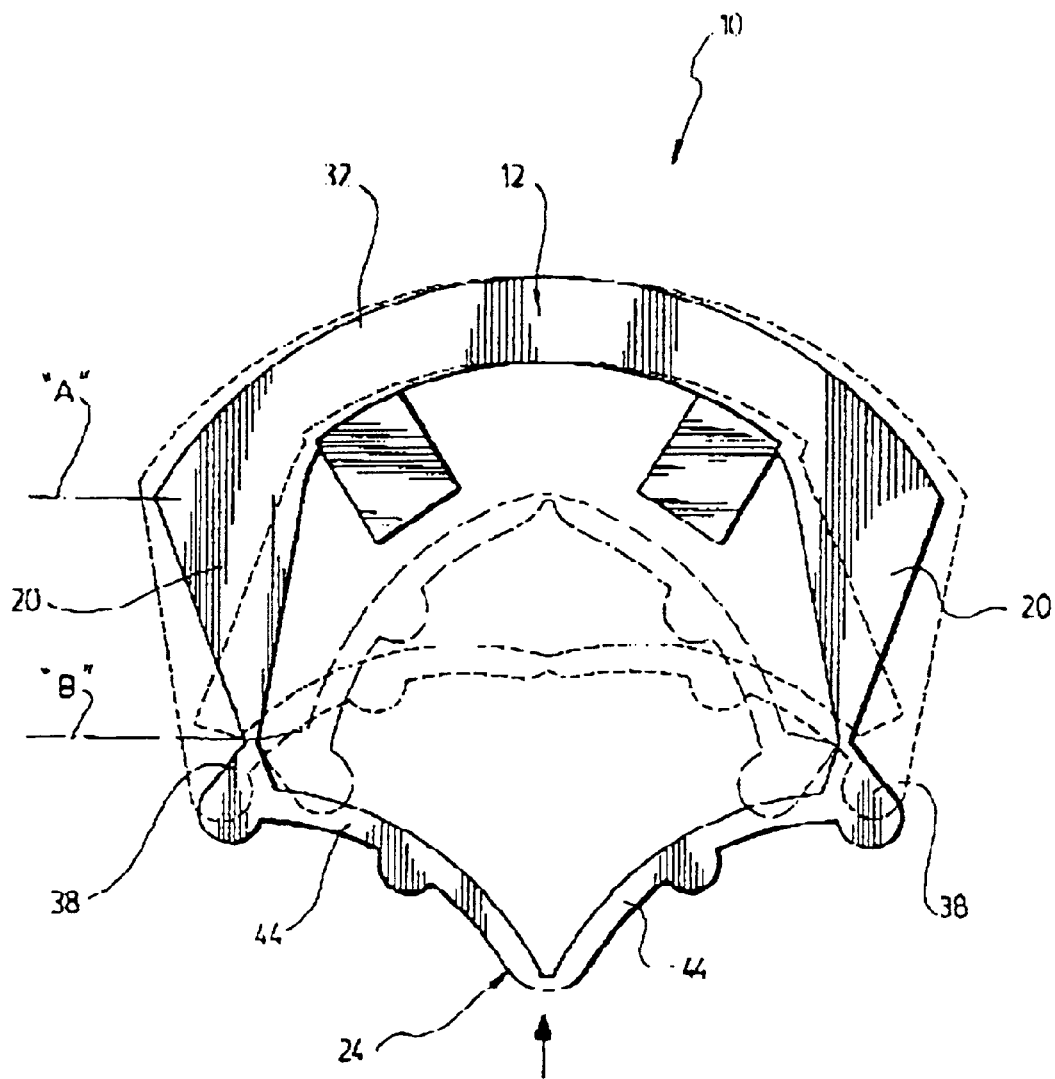
FIG. 4 is a front view of the frame of FIGS. 2 and 3 being in these different positions, namely the open position (full line), the closed position (long dotted line) and an intermediate position (short dotted line).

According to the present invention, the pressing member (24) is deformable between an open position shown in FIGS. 1a, 2 and 4 (full line) and a closed position shown in FIGS. 1b, 3 and 4 (long dotted line).

The open position of the pressing member (24) is characterized by the fact that the apex (26) of the pressing member (24) is located away from the first plane A and the second plane B, where the apex (26) is then at a greater distance away from the first plane A than from second plane B so that the portion (2) of the stem (1) can be inserted between the guiding member (12) and the pressing member (24).

The closed position of the pressing member (24) is characterised by the fact that the apex (26) is spaced away from the guiding member (12) at a predetermined distance which corresponds substantially to the range of thickness of the stem (1) in order to secure therein the portion (2) of the stem (1) after the portion (2) has been inserted between the guiding member (12) and the pressing member (24) which is in the open position. Once the portion (2) of the stem (1) is secured, it has a predetermined curvature following the inside concave surface (14) of the guiding member (12) as particularly shown in FIG. 1b.

According to the preferred embodiment of the invention, the guiding member (12) is generally arc-shaped and each of its ends (18) has a wing shape projecting in a direction away from the pressing member (24) as clearly shown in the perspective view of FIG. 2. The wing shaped ends (18) of the guiding member (12) may avoid possible injury to the stem (1) when being pressed against the guiding member (12) by closing the pressing member (24).

Advantageously, the frame (10) further comprises a flange (32) projecting perpendicularly from an outside surface (34) of the guiding member (12) as shown in FIGS. 2 and 3. The flange (32) is helpful for handling the frame (10) and moving it along a stem (1) of a plant. Other flanges or handles can be used as well.

According to the preferred embodiment of the invention and particularly shown in FIGS. 1a and 1b, the frame (10) further comprises retaining means for retaining the portion (2) of the stem (1) within the frame (10) when the pressing member (24) is in the closed position. Preferably, the spacers (20) are located adjacent to one (16) of the two longitudinal opposite sides (16, 16') of the guiding member (12), and the retaining means comprises two fingers (36) extending from the other one (16') of the two longitudinal opposite sides (16, 16') of the guiding member (12) towards the pressing member (24) in such a way that the portion (2) of the stem (1) secured by the pressing member (24) in the closed position, is enclosed between the spacers (20) and the fingers (36). The retaining means above-described works in combination with the spacers (20). The fingers (36) could also be located on the pressing member (12) as long as they do not interfere with each other when the pressing member (24) is in the open position. However, other retaining means can be used for retaining the portion (2) of the stem (1) in place between the guiding member (12) and the pressing member (24) without departing from the scope of the invention.

Referring now to FIGS. 2 and 3, the two spacers (20) are preferably located at the two opposite ends (18) of the guiding member (12), respectively. According to the preferred embodiment of the invention, the opposite ends (28) of the pressing member (24) are pivotally connected to the extremities (22) of the spacers (20) by means of (i) an extension (38) projecting away from the inside surface (30) of the pressing member (24) and located at each opposite end (28) of the pressing member (24), each extension (38) having an extremity (40), and (ii) a hinge (42) interconnecting the extremity (40) of each extension (38) and the extremity (22) of the corresponding spacer (20). Other ways to provide a functional hinge can be considered without departing from the scope of the invention.

Still according to the preferred embodiment, each of the extensions (38) and spacers (20) has a triangular shape wherein the extremity (40) of the extension (38) is one corner of the triangular shape of the extension (38), and the extremity (22) of the spacer (20) is one corner of the triangular shape of the spacer (20). Thus, each extension (38) faces the corresponding spacer (20) in such a way that one corner of their triangular shape are connected together by means of the hinge (42). In this preferred embodiment, the hinge (42) interconnecting the extremity (40) of each extension (38) and the extremity (22) of the corresponding spacer (22) is advantageously a flexible membrane interconnecting said corner of the extension (38) and said corner of the spacer (22). Such a hinge (42) is particularly convenient for molding the supporting frame (10) into one piece of plastic.

According to the preferred embodiment and referring more particularly to FIGS. 2 and 3, the pressing member (24) comprises two generally arc-shaped parts (44). Each part (44) has a convex surface (46). The inside surface (30) of the pressing member (24) is defined by the convex surfaces (46) of the two generally arc-shaped parts (44). The two parts (44) are preferably joined together by a hinge (48) located at the apex (26). The hinge (48) is advantageously a flexible membrane joining the two generally arc-shaped parts (44) of the pressing member (24). This kind of hinge (48) is particularly advantageous for having a frame (10) molded into one piece.

Referring now to FIG. 4, it can be noticed that the spacers (20) are moved in a direction opposite to each other when the pressing member (24) is in an intermediate position (short dotted line). the intermediate position of the pressing member (24) is unstable. In the intermediate position, the pressing member (24) may flip out into the open position (full line) or flip in into the closed position (long dotted line). For sake of clarity, the numbers of the elements are indicated only on the frame shown in full line. When the generally arc-shaped parts (44) are closed and pass by the intermediate position, the extensions (38) of the two parts (44) push the spacers (20). As a result, the guiding member (12) acts as a spring: in the intermediate position, it is stretched in order to be less arced; and in the open and closed positions, it is relaxed in its initial shape. The spring action of the guiding member (12) assure that the pressing member (24) (or the generally arced-shaped parts (44) according to the preferred embodiment) remains stable in the closed position and provides a pressure efficient to curve a portion (2) of a stem (1) which would be inserted between the guiding member (12) and the pressing member (24). In the preferred embodiment of the invention, the frame (10) is made of resilient plastic and the guiding member (12) uses this resilient characteristic in order to flex and therefore be less arced when the pressing member (24) is in the intermediate position. It can be noticed that the flange (32) does not prevent the guiding member (12) from flexing.

In the preferred embodiment, the guiding member (12) acts as a spring and is the one that flexes when the pressing member (24) is in the unstable intermediate position. However, in an other embodiment, the spacers (20) can be the ones that act as springs and consequently, they would be of a shape that allow flexion. In a further embodiment of the invention, the guiding member (12) and the spacers (20) could be non-flexible and the deformable pressing member (24) would comprise only one long resilient wall that flips in into the closed position in an arc-shaped position parallel to the guiding member (12), and that flips out into the open position in a mirror image arc-shaped position. It is to be understood that other pressing members can be used without departing from the scope of the invention, as long as they satisfy the need of flipping from the open position to closed position in order to allow the insertion of the portion (2) of the stem (1) in the open position and press on the portion (2) of the stem (1) in the closed position.

Still according to the preferred embodiment of the invention, the guiding member (12) is generally arc shaped and substantially parallel to the two generally arc-shaped parts (44) of the pressing member (24) when the pressing member (24) is in the closed position. Therefore, the guiding member (12) and the generally two arc-shaped parts (11) define a curved elongated space having a width corresponding substantially to the given range of thickness of the stem (1) as appreciated in FIG. 1b.

According to the preferred embodiment of the invention and referring to FIG. 2, the guiding member (12) has at least one reinforcement bar (50) extending on an outside surface (34), and the pressing member (12) has at least one reinforcement bar (52) extending on an outside surface (54). Preferably, the pressing member (24) has two reinforcement bars (52), one on each part (44).

Preferably, a straight portion (2) of the stem (1) can be inserted between the guiding member (12) and the pressing member (24) when the pressing member (24) is in the open position.

The pressing member (24) can be advantageously moved from the open position to the closed position and vice-versa. Opening the pressing member (24) can be useful to displace the frame (10) along the stem (1) if necessary. For opening the pressing member (24), a user can press simultaneously on the edges (56) (shown in FIG. 2) provided on each of the opposite ends (28) of the pressing member (24) in order to spread the edges (56) which results in pivoting the opposite ends (28) of the pressing member (24) around its connection to the spacers (20) and moving the apex (26), or the hinge (48), away from the first and second planes A and B where the apex (26), or the hinge (48), is at a greater distance away from the first plane A than from second plane B. The direction for pressing on the edges (56) to open the pressing member (24) is indicated on FIG. 3 with wide arrows.

Only one hand is necessary for closing the pressing member (24) and securing a portion (2) of a stem (1) in the supporting frame (10) according to the invention. A user just has to push the opened pressing member (24) in the direction of the guiding member (12) as indicated by the wide arrow in FIG. 4.

Advantageously, when a portion (2) of the stem (1) is secured in the supporting frame (10) according to the invention, the frame (10) stays in place along the stem (1). This is provided by the fact that the center of gravity of the frame is below the radius of the arc-shape of the guiding and the pressing members.

Although a preferred embodiment of the invention has been described in detail herein and illustrated in the accompanying drawings, it is to be understood that the invention is not limited to this precise embodiment and that various changes and modifications may be effected therein without departing from the scope or spirit of the invention as defined in the appended claims.

What is claimed is:

1. A supporting frame for a portion of a stem of a plant, said stem being of a thickness falling within a given range, said frame comprising:

a guiding member having an inside concave surface, two longitudinal opposite sides and two opposite ends, the two opposite ends extending in a first plane;

two spacers projecting away from the inside concave surface of the guiding member, each spacer having an extremity, the extremities of the spacers extending in a second plane parallel to the first plane; and a deformable pressing member defining an apex and having two opposite ends and an inside surface facing the inside concave surface of the guiding member, the two opposite ends of the pressing member being pivotally connected to the two extremities of the spacers respectively, the pressing member comprising two parts joined together by a hinge where the hinge is at the apex;

wherein the guiding member, the pressing member and each spacer define a U-shaped cross-section for permitting insertion of the portion of the stem of the plant therein; and wherein said pressing member is deformable between:

an open position where its apex is located away from the first and the second planes, said apex then being at a greater distance away from the first plane than from the second plane whereby the portion of the stem can be inserted between the guiding member and the pressing member; and a closed position where the apex is spaced away from the guiding member at a predetermined distance which corresponds substantially to the range of thickness of the stem in order to secure therein the portion of the stem after said portion has been inserted between the guiding member and the pressing member in said open position, the portion of the stem once secured having a predetermined curvature following the inside concave surface of the guiding member.

2. The frame of claim 1, wherein the guiding member is generally arc-shaped.

3. The frame of claim 1, wherein each of the ends of the guiding member has a wing shape projecting in a direction away from the pressing member.

4. The frame of claim 1, further comprising a flange projecting perpendicularly from an outside surface of the guiding member.

5. The frame of claim 1, further comprising retaining means for retaining the portion of the stem within the frame when the pressing member is in the closed position.

6. The frame of claim 5, wherein the spacers are located adjacent to one of the two longitudinal opposite sides of the guiding member, and wherein the retaining means comprises two fingers extending from the other one of the two longitudinal opposite sides of the guiding member towards the pressing member in such a way that the portion of the stem secured by the pressing member in the closed position, is enclosed between the spacers and the fingers.

7. The frame of claim 1, wherein the two spacers are located at the two opposite ends of the guiding member, respectively.

8. The frame of claim 7, wherein each of the opposite ends of the pressing member is pivotally connected to the extremity of a respective one of the spacers by means of:

an extension having an extremity and projecting away from the inside surface of the pressing member and located at a respective one of the opposite ends of the pressing member, and a hinge interconnecting the extremity of the extension and the extremity of its corresponding spacer.

9. The frame of claim 8, wherein each of the extensions and the spacers has a triangular shape, the extremity of each extension being one corner of the triangular shape of the extension, the extremity of each spacer being one corner of the triangular shape of the spacer, and wherein the hinge interconnecting the extremity of the extension and the extremity of the corresponding spacer is a flexible membrane interconnecting said corner of the extension and said corner of the corresponding spacer.

10. The frame of claim 1, wherein the pressing member comprises two generally arc-shaped parts, each part having a convex surface, the inside surface of the pressing member being defined by the convex surfaces of the two generally arc-shaped parts, said two parts being joined together by a hinge located at the apex.

11. The frame of claim 10, wherein the hinge of the pressing member is a flexible membrane joining the two generally arc-shaped parts of the pressing member.

12. The frame of claim 10, wherein the guiding member is generally arc-shaped and substantially parallel to the two generally arc-shaped parts of the pressing member in the closed position.

13. The frame of claim 1, wherein the guiding member has at least one reinforcement bar extending on an outside surface, and wherein the pressing member has at least one reinforcement bar extending on an outside surface.

14. The frame of claim 1, wherein a straight portion of the stem can be inserted between the guiding member and the pressing member when the pressing member is in the open position.

15. A supporting frame for a portion of a stem of a plant, said stem being of a thickness falling within a given range, said frame comprising:

a guiding member having an inside concave surface, two longitudinal opposite sides and two opposite ends, the two opposite ends extending in a first plane;

two spacers projecting away from the inside concave surface of the guiding member, each spacer having an extremity, the extremities of the spacers extending in a second plane parallel to the first plane; and a pressing member having two opposite ends and comprising two parts joined together by a hinge, each of the two parts having an inside surface which faces the inside concave surface of the guiding member, the two opposite ends of the pressing member being pivotally connected to the two extremities of the spacers, respectively;

wherein the guiding member, the pressing member and each spacer define a U-shaped cross-section for permitting insertion of the portion of the stem of the plant therein; and wherein said pressing member is deformable between:
an open position where its hinge is located away from the first and the second planes, said hinge then being at a greater distance away from the first plane than from the second plane whereby the portion of the stem can be inserted between the guiding member and the pressing member; and
a closed position where the hinge is spaced away from the guiding member at a predetermined distance which corresponds substantially to the range of thickness of the stem in order to secure therein the portion of the stem after said portion has been inserted between the guiding member and the pressing member in said open position, the portion of the stem once secured having a predetermined curvature following the inside concave surface of the guiding member.

16. The frame of claim 15, wherein the guiding member is generally arc-shaped.

17. The frame of claim 15, wherein each of the ends of the guiding member has a wing shape projecting in a direction away from the pressing member.

18. The frame of claim 15, further comprising a flange projecting perpendicularly from an outside surface of the guiding member.

19. The frame of claim 15, further comprising retaining means for retaining the portion of the stem within the frame when the pressing member is in the closed position.

20. The frame of claim 19, wherein the spacers are located adjacent to one of the two longitudinal opposite sides of the guiding member, and wherein the retaining means comprises two fingers extending from the other one of the two longitudinal opposite sides of the guiding member towards the pressing member in such a way that the portion of the stem secured by the pressing member in the closed position, is enclosed between the spacers and the fingers.

21. The frame of claim 15, wherein the two spacers are located at the two opposite ends of the guiding member, respectively.

22. The frame of claim 21, wherein each of the opposite ends of the pressing member is pivotally connected to the extremity of a respective one of the spacers by means of:

an extension having an extremity and projecting away from the inside surface of the pressing member and located at a respective one of the opposite ends of the pressing member, and a hinge interconnecting the extremity of the extension and the extremity of its corresponding spacer.

23. The frame of claim 22, wherein each of the extensions and the spacers has a triangular shape, the extremity of each extension being one corner of the triangular shape of the extension, the extremity of each spacer being one corner of the triangular shape of the spacer, and wherein the hinge interconnecting the extremity of the extension and the extremity of the corresponding spacer is a flexible membrane interconnecting said corner of the extension and said corner of the corresponding spacer.

24. The frame of claim 15, wherein each part of the pressing member is generally arc-shaped, the inside surface of each part being convex.

25. The frame of claim 24, wherein the hinge of the pressing member is a flexible membrane joining the two generally arc-shaped parts of the pressing member.

26. The frame of claim 24, wherein the guiding member is generally arc-shaped and substantially parallel to the two generally arc-shaped parts of the pressing member in the closed position.

27. The frame of claim 15, wherein the guiding member has at least one reinforcement bar extending on an outside surface, and wherein the pressing member has at least one reinforcement bar extending on an outside surface.

28. The frame of claim 15, wherein a straight portion of the stem can be inserted between the guiding member and the pressing member when the pressing member is in the open position.

29. A supporting frame for a portion of a stem of a plant, said stem being of a thickness falling within a given range, said frame comprising:

a generally arc-shaped guiding member having an inside concave surface, two longitudinal opposite sides and two opposite ends, the two opposite ends extending in a first plane;

two spacers projecting away from the inside concave surface of the guiding member and located at the two opposite ends of the guiding member and adjacent to one of its two longitudinal opposite sides, each spacer having an extremity, the extremities of the spacers extending in a second plane parallel to the first plane;

a pressing member having two opposite ends and comprising two generally arc-shaped parts joined together by a hinge, each of the two parts having an inside convex surface which faces the inside concave surface of the guiding member, the two generally arc-shaped parts being substantially parallel to the generally arc-shaped guiding member, the pressing member having an extension projecting away from the inside convex surface of each of its parts and located at each of its opposite ends, each extension having an extremity pivotally connected to the extremity of the corresponding spacer by means of a hinge, the pressing member being deformable between an open position and a closed position; and retaining means for retaining the portion of the stem within the frame when the pressing member is in the closed position, the retaining means comprising two fingers extending from the other one of the two longitudinal opposite sides of the guiding member towards the pressing member in such a way that the portion of the stem secured by the pressing member in the closed position, is enclosed between the spacers and the fingers;

wherein the guiding member, the pressing member and each spacer define a U-shaped cross-section for permitting insertion of the portion of the stem of the plant therein;

wherein the pressing member is in said open position when its hinge is located away from the first and the second planes, said hinge then being at a greater distance away from the first plane than from the second plane whereby a straight portion of the stem can be inserted between the guiding member and the pressing member; and wherein the pressing member is in said closed position when the hinge is spaced away from the guiding member at a predetermined distance which corresponds substantially to the range of thickness of the stem in order to secure therein the portion of the stem after said portion has been inserted between the guiding member and the pressing member in said open position, the portion of the stem once secured having a predetermined curvature following the inside concave surface of the guiding member.

* * * * *

UNITED STATES PATENT AND TRADEMARK OFFICE
CERTIFICATE OF CORRECTION

PATENT NO. : 6,233,869 B1
DATED : May 22, 2001
INVENTOR(S) : Jerome Dearo

Page 1 of 1

It is certified that error appears in the above-identified patent and that said Letters Patent is hereby corrected as shown below:

Column 1,
Line 32, "well" should be -- will --.

Column 2,
Line 18, "place" should be -- plane --.

Column 3,
Line 24, "plane" should be -- plant --.

Column 4,
Line 3, after "member", "." should be -- ; --.

Coumn 6,
Line 40, "the" should be -- The --.

Signed and Sealed this

Eighth Day of January, 2002

*Attest:*

JAMES E. ROGAN
*Attesting Officer*  *Director of the United States Patent and Trademark Office*